(12) United States Patent
Bonhote et al.

(10) Patent No.: US 7,517,463 B1
(45) Date of Patent: Apr. 14, 2009

(54) PERPENDICULAR POLE WITH BILAYER GAP

(75) Inventors: Christian Rene Bonhote, San Jose, CA (US); Dan Saylor Kercher, Santa Cruz, CA (US); Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/005,572

(22) Filed: Dec. 26, 2007

(51) Int. Cl.
*B44C 1/22* (2006.01)
(52) U.S. Cl. .......................... 216/22; 438/3; 29/603.12
(58) Field of Classification Search .................. 216/22; 427/127, 128; 438/3; 29/603.11, 603.12, 29/603.16, 603.18
See application file for complete search history.

(56) References Cited

U.S. PATENT DOCUMENTS 7,120,989 B2 * 10/2006 Yang et al. ............... 29/603.12

* cited by examiner

*Primary Examiner*—Roberts Culbert
(74) *Attorney, Agent, or Firm*—Lorimer Labs; D'Arcy H. Lorimer (57) ABSTRACT

A perpendicular write pole having dual gap layers is disclosed. An outer gap layer, resistant to etching and corrosion in alkaline solutions protects the inner gap layer during photo resist development. An inner gap layer, resistant to acid etch conditions, protects the magnetic pole materials during removal of portions of the outer gap layer prior to electroplating of the pole to form the flare point.

20 Claims, 11 Drawing Sheets

PERPENDICULAR POLE WITH BILAYER GAP

BACKGROUND OF THE INVENTION

1. Field of the Invention

This invention relates to methods for fabricating thin film magnetic write heads. More specifically, the invention relates to methods for fabricating a thin film write head for perpendicular recording having a bi-layer non-magnetic gap, wherein the outer layer is resistant to the caustic process conditions present in photo-resist development.

2. Description of the Related Art

As areal densities for magnetic storage media continue to increase, the critical dimensions for thin film write heads are driven to smaller levels. For future designs, write pole dimensions such as track widths (TW) and flare points (FP) will be on the order of 50 nm. Gap layers, which separate the magnetic pole from the shield structure, will shrink in thickness along with other pole dimensions. These thinner layers are increasingly susceptible to being etched or damaged by processing chemistry of the prior art. In particular, one common gap layer material in popular use is alumina. In very thin layers, this material is susceptible to being etched if exposed to standard photo-resist developer solutions which are generally caustic (pH>7) in nature. Problems can occur if an alumina gap layer is deposited over a pole layer, then subsequently masked with a conventional photo-resist. Damage to the alumina layer can occur during photo-resist development, compromising the subsequent performance of the write pole. These problems can be magnified if multiple photo-resist steps are carried out over the same alumina gap layer, as may occur in head production if a photo-resist layer is stripped and re-applied due to an imaging error. What is needed is a better process for making a perpendicular magnetic head that minimizes the sensitivity of non-magnetic gap layers to photo-resist processing.

Figure 1:
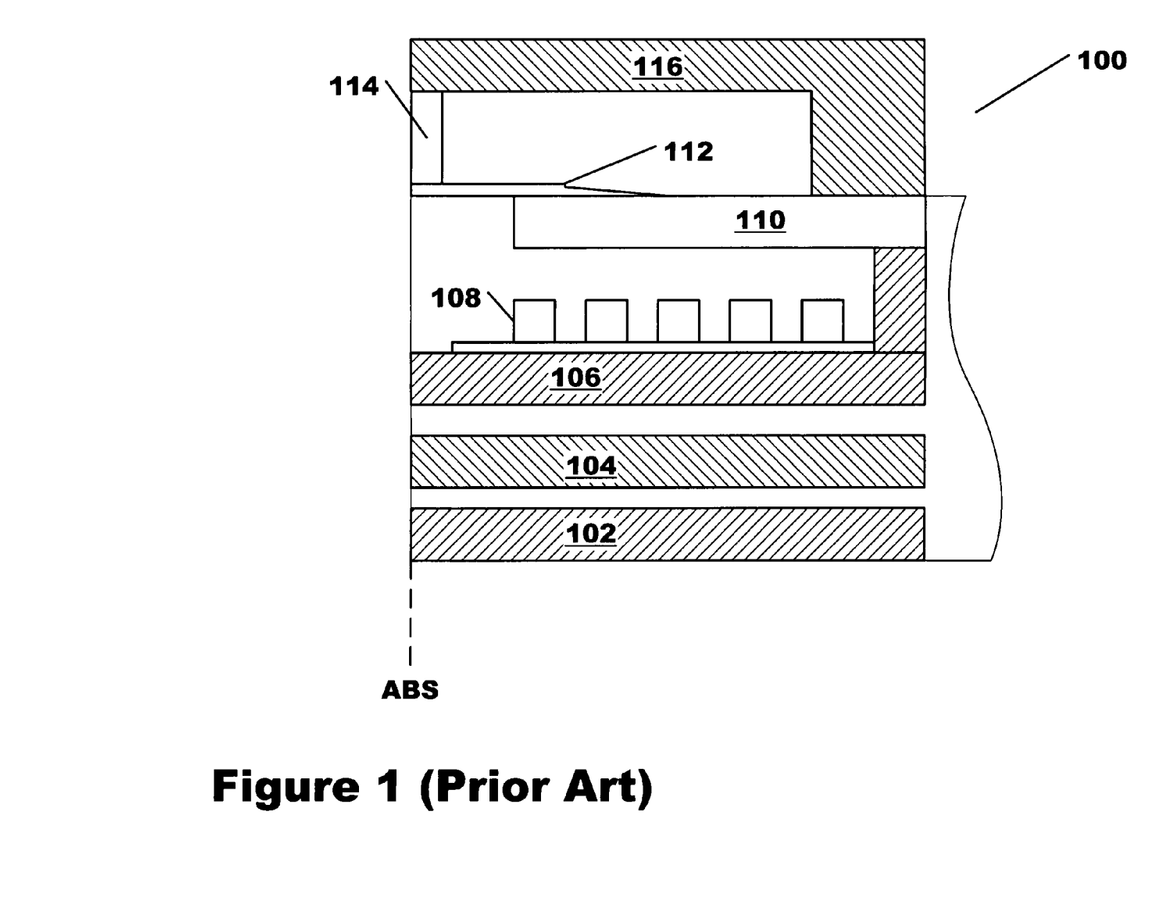
FIG. 1 (Prior Art) is a partial cross section view of a typical thin film perpendicular write head structure.

FIG. 1 (Prior Art) is a partial, cross sectional view of a typical thin film perpendicular write head 100. The head comprises shield layers 102, 104, shaping layer 110, coil structure 108, main pole 112, lower return pole layer 106, wrap around shield 114, and upper return pole layer 116. Alternatively, structure 114 may also be a trailing shield. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

SUMMARY OF THE INVENTION

It is an object of the present invention to provide a method for fabricating a thin film perpendicular write head including fabricating a magnetic pole layer, the magnetic pole layer having a first portion and a second portion; depositing a first non-magnetic gap layer on the first and said second portions of the magnetic pole layer, the first non-magnetic gap layer being resistant to etching in solutions having a pH less than 7; depositing a second non-magnetic gap layer on the first non-magnetic gap layer deposited on the first and said second portions of the magnetic pole layer, the second non-magnetic gap layer being resistant to etching in solutions having a pH greater than 7; covering the second non-magnetic gap layer deposited on the first portion of the pole layer with a photo resist layer; removing the second non-magnetic gap layer deposited on the second portion of the magnetic pole with a solution having a pH of less than 7, without damaging said photo resist layer; and, removing the first non-magnetic gap layer deposited on the second portion of the magnetic pole layer with a solution having a pH greater than 7, without damaging the second portion of the magnetic pole.

It is an object of the present invention to provide a method for fabricating a thin film perpendicular write head including fabricating a magnetic pole layer, the magnetic pole layer having a first portion and a second portion; depositing a first non-magnetic gap layer on the first and said second portions of the magnetic pole layer, the first non-magnetic gap layer containing alumina; depositing a second non-magnetic gap layer on the first non-magnetic gap layer deposited on the first and said second portions of the magnetic pole layer, the second non-magnetic gap layer being resistant to etching in solutions having a pH greater than 7; covering the second non-magnetic gap layer deposited on the first portion of the pole layer with a photo resist layer; removing the second non-magnetic gap layer deposited on the second portion of the magnetic pole with a solution having a pH of less than 7, without damaging said photo resist layer; and, removing the first non-magnetic gap layer deposited on the second portion of the magnetic pole layer with a solution having a pH greater than 7, without damaging the second portion of the magnetic pole.

It is yet another object of the present invention to provide a method for fabricating a thin film perpendicular write head including fabricating a magnetic pole layer, the magnetic pole layer having a first portion and a second portion; depositing a first non-magnetic gap layer on the first and said second portions of the magnetic pole layer, the first non-magnetic gap layer containing alumina; depositing a second non-magnetic gap layer on the first non-magnetic gap layer deposited on the first and said second portions of the magnetic pole layer, wherein the second non-magnetic gap layer is chosen from the group consisting of Cr, Al, Ti, oxides of Ti, and oxides of tantalum; removing the second non-magnetic gap layer deposited on the second portion of the magnetic pole with a solution having a pH of less than 7; and, removing the first non-magnetic gap layer deposited on the second portion of the magnetic pole layer with a solution having a pH greater than 7.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

FIG. 1 (Prior Art) has been discussed above in the Background section.

Figure 2:
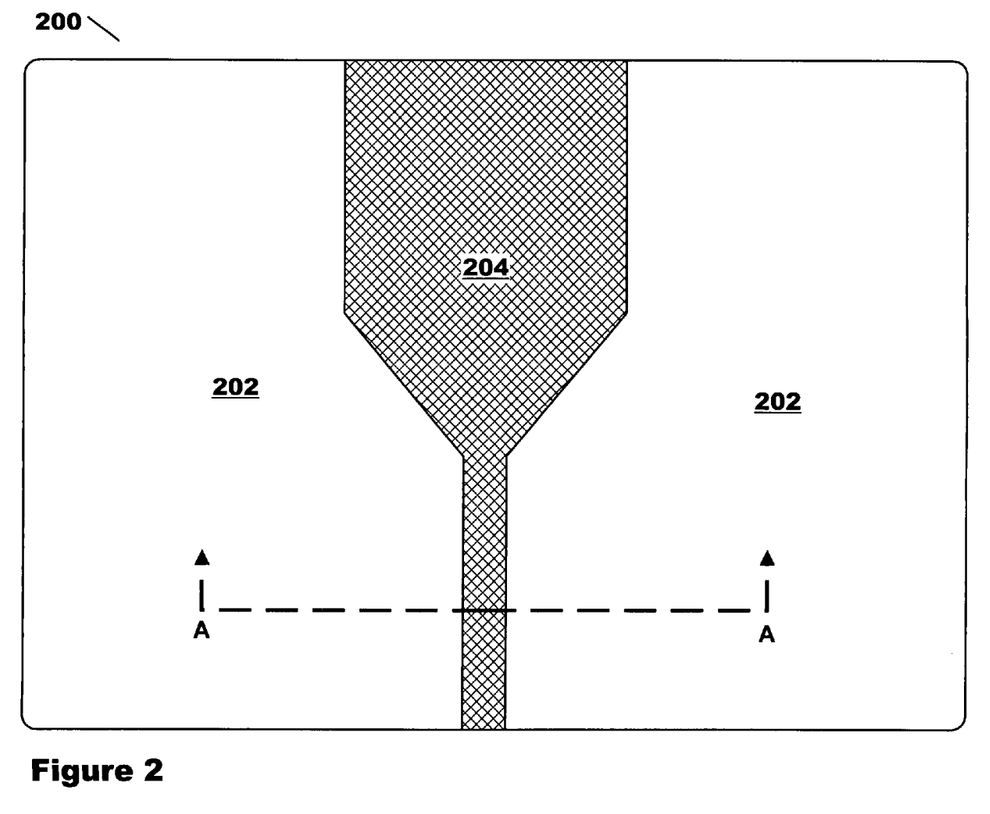
FIG. 2 is a plan view of a write pole layer of a thin film perpendicular head, in accordance with an embodiment of the present invention.
Figure 3:
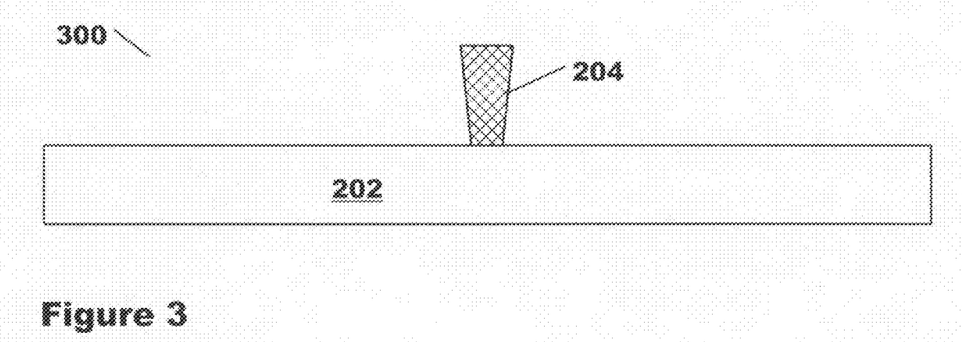
FIG. 3 is a partial cross section view through section A-A of FIG. 2, in accordance with an embodiment of the present invention.

FIG. 2 is a plan view 200 of a write pole layer 204 of a thin film perpendicular head, in accordance with an embodiment of the present invention. The write pole layer 204, deposited on base layer 202, can be produced by either an additive process, or subtractive process, (not shown) in accordance with processes well known to those skilled in the art. In an additive process, the pole is deposited within a trench of an oxide or other spacer layer, wherein the trench has been etched to produce the desired shape of the pole layer. The spacer layer is removed following deposition of the magnetic material comprising the pole layer. In a subtractive process, a blanket layer of magnetic pole material is deposited. This layer is then masked and the unwanted material removed, leaving the pole layer as shown in FIG. 2. Either of the foregoing methods are suitable to produce pole layer 204 of FIG. 2. FIG. 3 is a partial cross section view 300 through section A-A of FIG. 2. FIG. 3 is a simplified view of pole layer 204. In actual practice, the ion beam milling used to taper the sides of pole layer 204 will cause recession of the surface of base layer 202 on either side of pole layer 204. This detail has been omitted for simplicity, as it has little bearing on the functionality of embodiments of the present invention. Subsequent to the formation of pole layer 204, a conformal gap layer is deposited on the exposed surfaces of pole layer 204. Typically, this is an alumina layer deposited via ALD (atomic layer deposition), which is chosen due to the ability to cover the reentrant vertical surfaces of pole layer 204. Following gap layer deposition, it is desirable to mask the alumina coated pole to remove a portion of the non-conductive gap material, so that second flare point can be introduced by electroplating additional magnetic material on the pole. In previous processes of the prior art, the masking was done by coating the entire structure with a layer of photo resist, imaging the photo resist, and developing the photo resist to create the mask. However, it has been discovered that during photo resist development, the alkaline conditions used by the development chemistry attack the very thin alumina gap layer, creating thickness uniformity problems, thin spots, or pinholes. ALD alumina etch rates of 5 to 8 nm/min have been observed, which is high enough to destroy the alumina gap layer is just minutes. The problem is magnified if, for some reason, the photo resist mask needs to be stripped and re-applied due to alignment errors, as is sometimes required in volume production. These defects are unacceptable for suitable head performance. The present invention solves this problem by applying another gap layer over the alumina, which is resistant to attack by alkaline solutions, has good photo resist adhesion, and is suitable for use as a gap material at the ABS (air bearing surface).

One might suggest the replacement of alumina with metallic gap materials resistant to corrosion in alkaline solutions, but a number of other requirements preclude this suggestion. First, the gap material adjacent to the pole material must be removed from the pole without attack of the pole materials. This is required to build the flare point by plating more magnetic material onto the existing pole. A non-magnetic metallic gap material (such as a noble metal) could replace alumina, but could not be removed from the pole prior to plating. While magnetic material could be plated over the noble metal gap to create the flare point, this would not be the same as directly increasing the pole dimension with magnetic material alone, and would alter the magnetic properties of the pole. Non-conductive, non-magnetic materials generally resistant to alkaline attack are typically etched in acidic solutions, but these acidic solutions will also attack the magnetic pole materials, so their removal from the pole by etching would not be selective enough to prevent damage to the pole.

Figure 4:
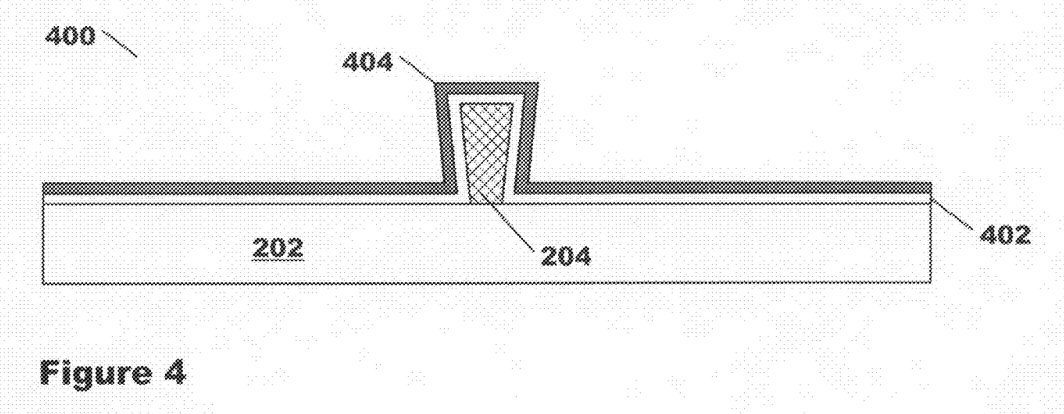
FIG. 4 is a partial cross section view as presented in FIG. 3, subsequent to the deposition of gap layers 402 and 404, in accordance with an embodiment of the present invention.

FIG. 4 is a partial cross section view 400, as presented in FIG. 3, subsequent to the deposition of gap layers 402 and 404, in accordance with an embodiment of the present invention. Gap layer 402 is typically alumina deposited by ALD, but may be other non-magnetic materials that are susceptible to chemical attack or corrosion in alkaline conditions (pH>7). Gap layer 402 is chosen to be resistant to etching in acid chemistries (pH<7), with or without an oxidant. Gap layer 402 also serves to protect the magnetic pole layer 204 from attack by acid chemistries (pH<7). Gap layer 404 is deposited over gap layer 402. Gap layer 404 may be any non-magnetic metal resistant to corrosion in alkaline solutions (pH>7) such as Ti, Al, or Cr, deposited by a suitable vapor deposition process. Precious metals such as Au, Pd, Rh, and Ru may be used, but are less desirable because they must be removed in an aggressive acid solutions, such as aqua regia, which will damage the photo resist mask. Gap 404 may also be comprised of an oxide such as tantalum oxide, titanium oxide, or silicon dioxide. While wet etching of gap layer 404 is preferred, dry etching is also possible for materials such as silicon dioxide. If suitable, wet etching of gap layer 404 is performed in acid chemistries (pH<7) with or without the use of peroxide or other oxidants. The etch conditions of gap layer 404 are chosen such that they will not attack the underlying gap layer 402. Subsequent to the blanket depositions of gap layers 402 and 404, a photo resist layer is deposited, imaged, and developed.

Figure 5:
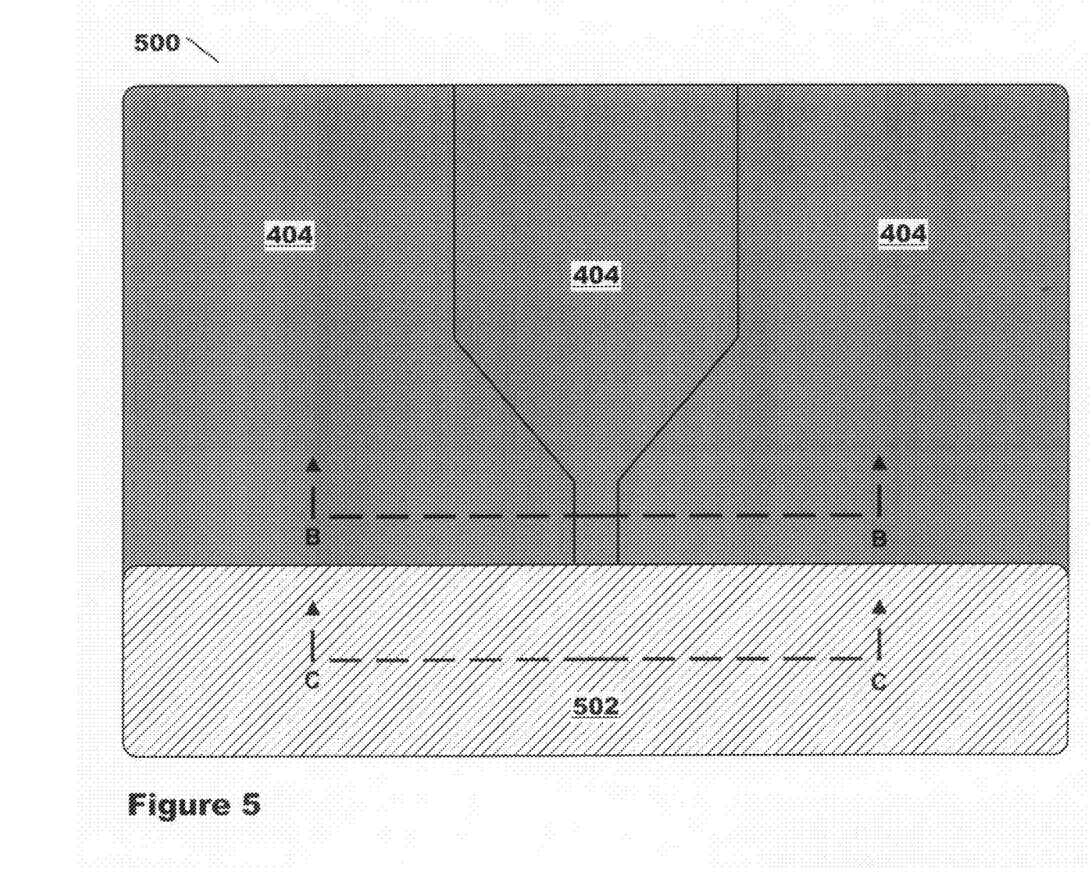
FIG. 5 is a plan view of the structure of FIG. 4 subsequent to the deposition and development of photo resist mask layer 502, in accordance with an embodiment of the present invention.
Figure 6:
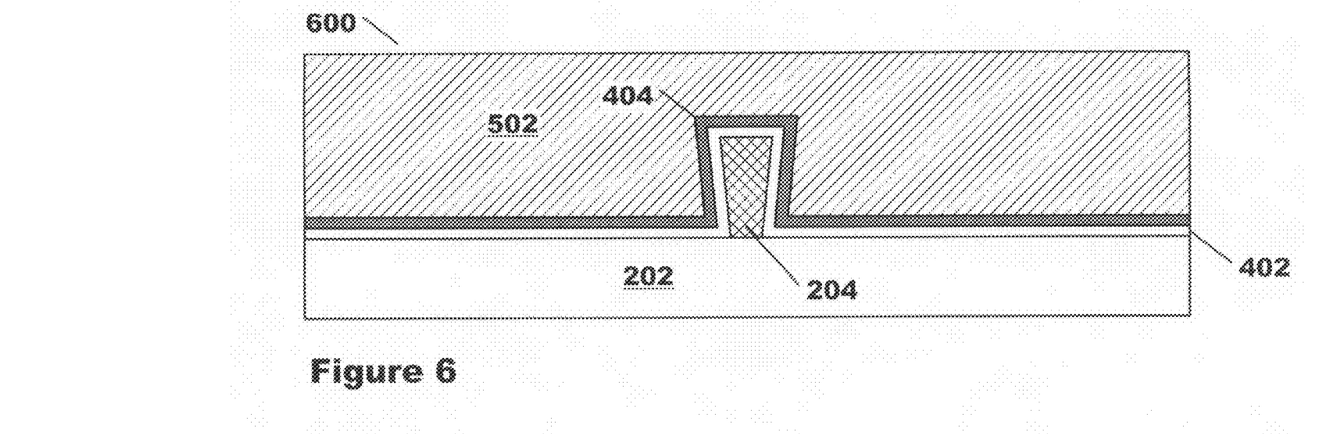
FIG. 6 is a partial cross section view through section C-C of FIG. 5, in accordance with an embodiment of the present invention.
Figure 7:
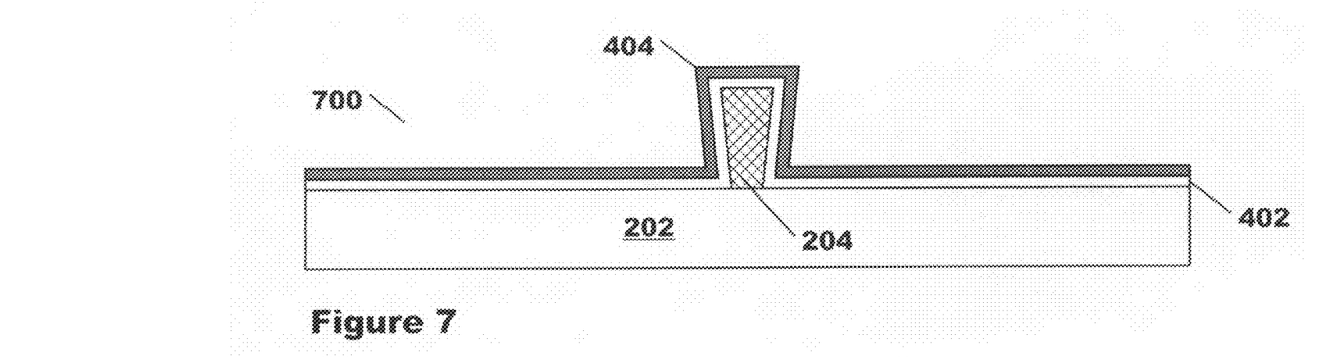
FIG. 7 is a partial cross section view through section B-B of FIG. 5, in accordance with an embodiment of the present invention.

FIG. 5 is a plan view 500 of the structure of FIG. 4, subsequent to the deposition and development of photo resist mask layer 502, in accordance with an embodiment of the present invention. Mask layer 502 is provided to protect a portion of pole layer 204 and gap layers 402/404, in preparation for the formation of a second flare point. FIG. 6 is a partial cross section view 600 through section C-C of FIG. 5. FIG. 7 is a partial cross section view 700 through section B-B of FIG. 5.

Figure 8:
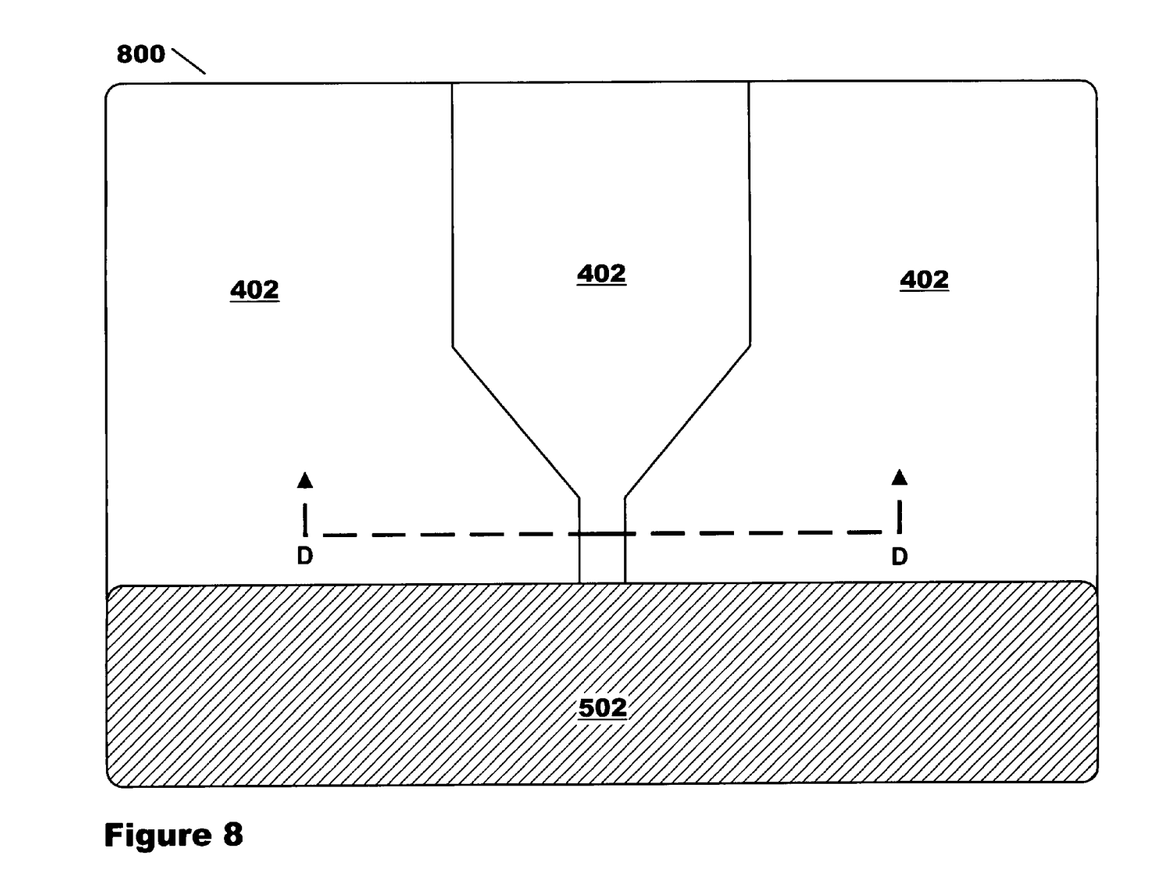
FIG. 8 is a plan view of the structure of FIGS. 6 and 7, subsequent to the removal of a portion of outer gap layer 404, in accordance with an embodiment of the present invention.
Figure 9:
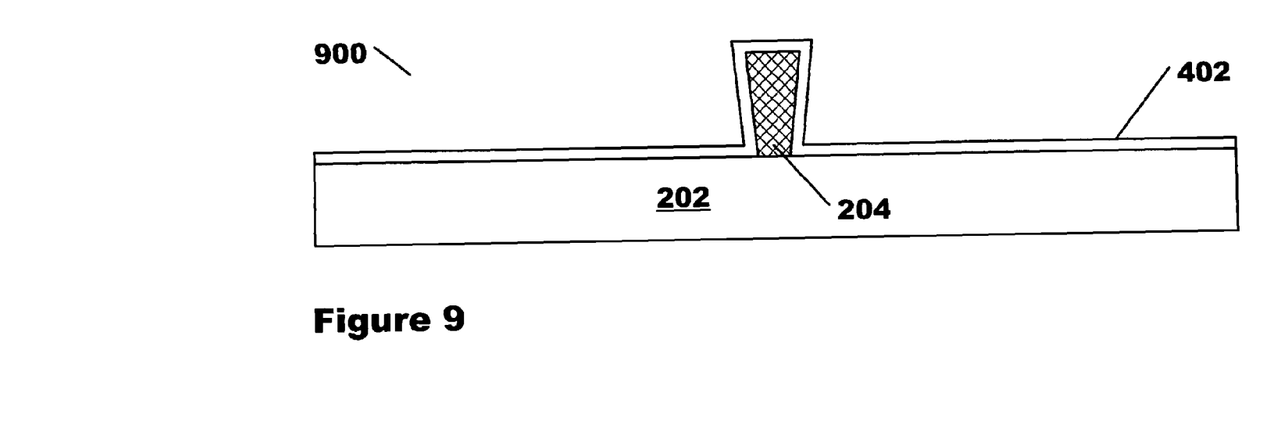
FIG. 9 is a partial cross section view through section D-D of FIG. 8, in accordance with an embodiment of the present invention.

FIG. 8 is a plan view 800 of the structure of FIGS. 6 and 7, subsequent to the removal of the exposed portion of outer gap layer 404, in accordance with an embodiment of the present invention. Etch conditions of layer 404 are chosen (pH<7) such that underlying layer 402 is minimally etched. FIG. 9 is a partial cross section view 900 through section D-D of FIG. 8.

Figure 10:
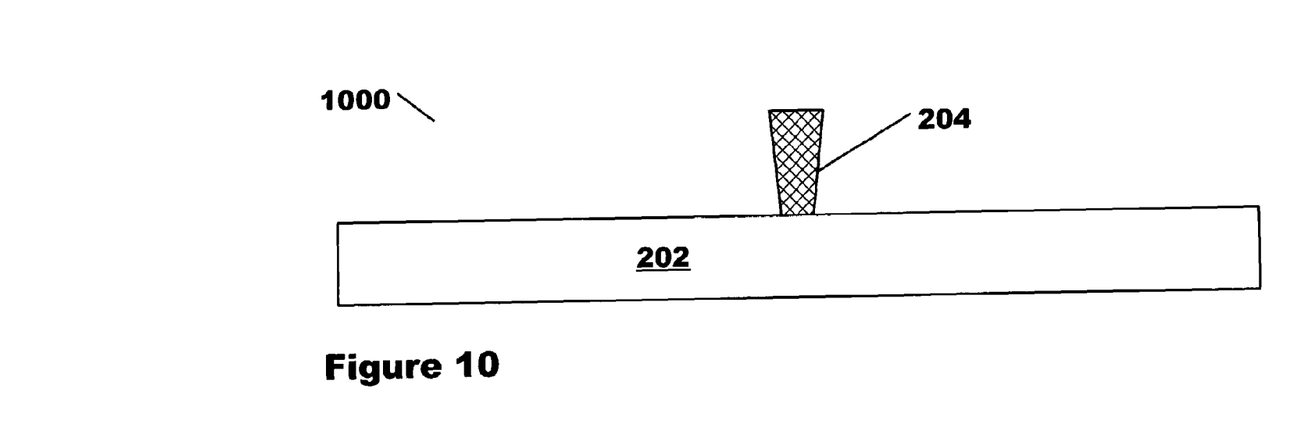
FIG. 10 is a partial cross section view of the structure of FIG. 9, subsequent to the removal of a portion of gap layer 402, in accordance with an embodiment of the present invention.
Figure 11:
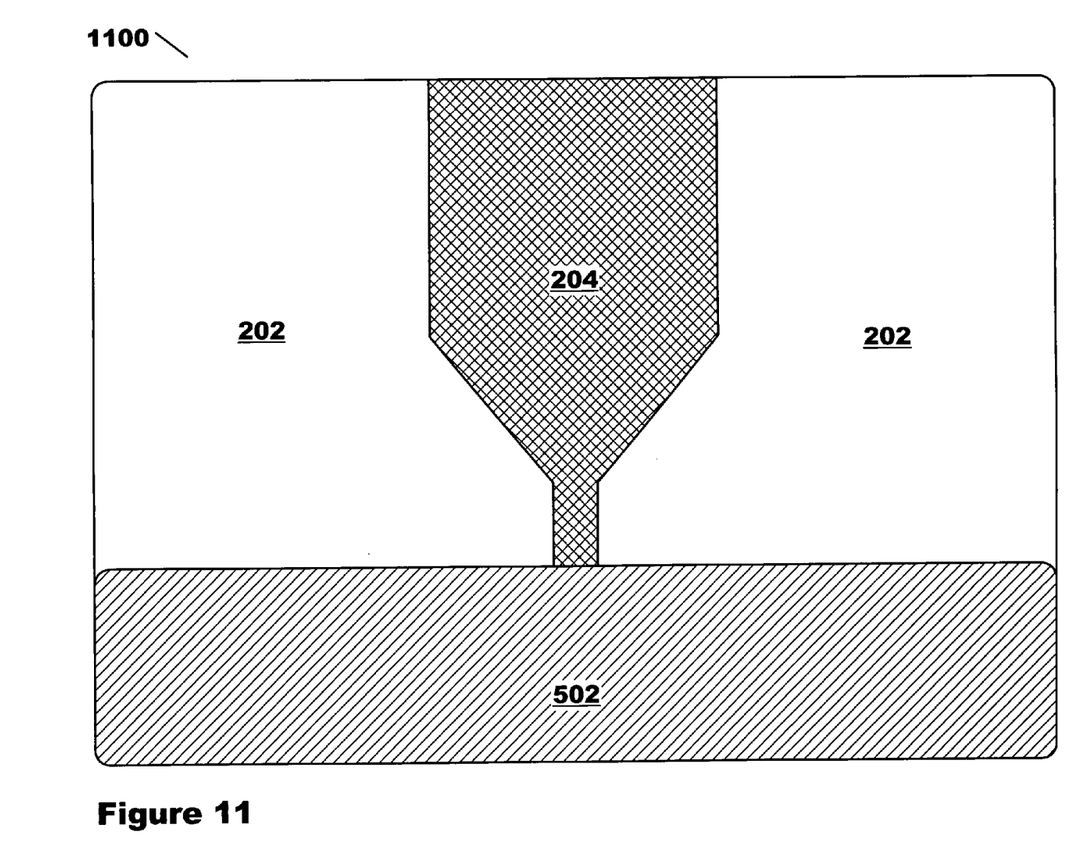
FIG. 11 is a plan view of the structure of FIG. 10, in accordance with an embodiment of the present invention.

FIG. 10 is a partial cross section view 1000 of the structure of FIG. 9, subsequent to the removal of the exposed portion of gap layer 402, in accordance with an embodiment of the present invention. Etch conditions are chosen such that gap layer 402 is removed without appreciable chemical attack of underlying pole layer 204. Typically, these would be alkaline (pH>7) wet etch conditions. FIG. 11 is a plan view 1100 of the structure of FIG. 10.

Figure 12:
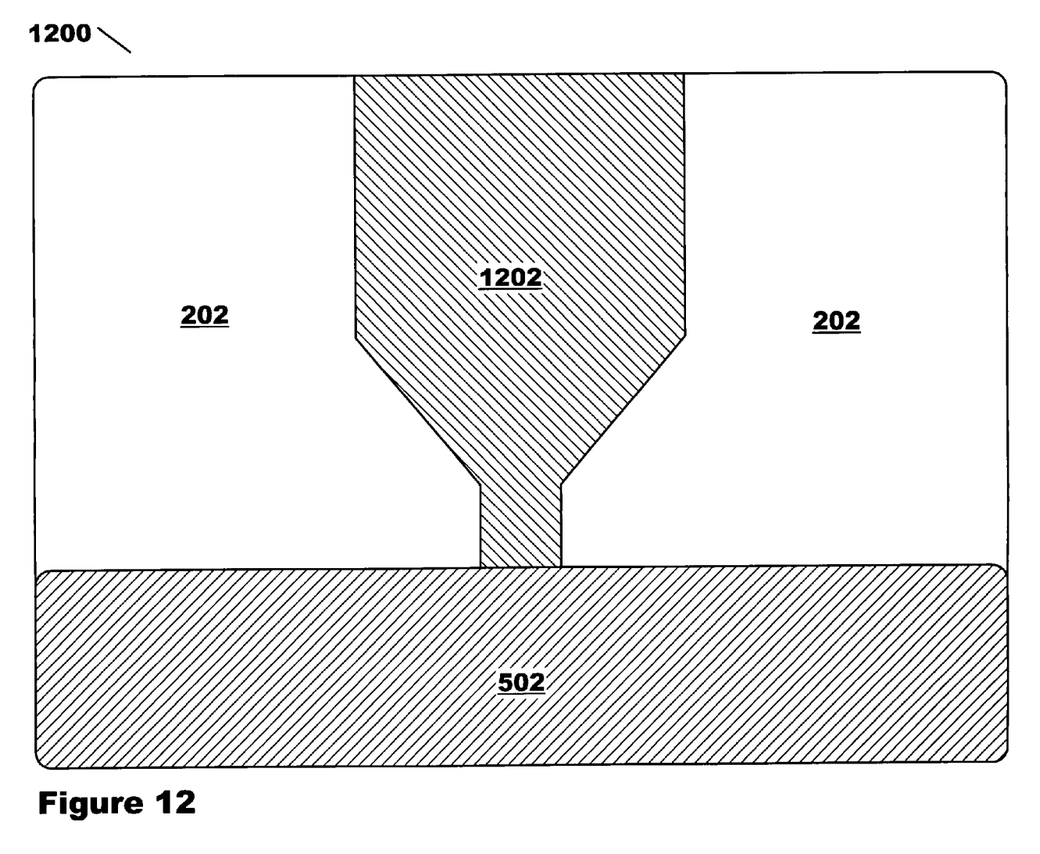
FIG. 12 is a plan view of the structure of FIG. 11, subsequent to the electroplating of layer 1202 onto the exposed portion of pole layer 204, in accordance with an embodiment of the present invention.
Figure 13:
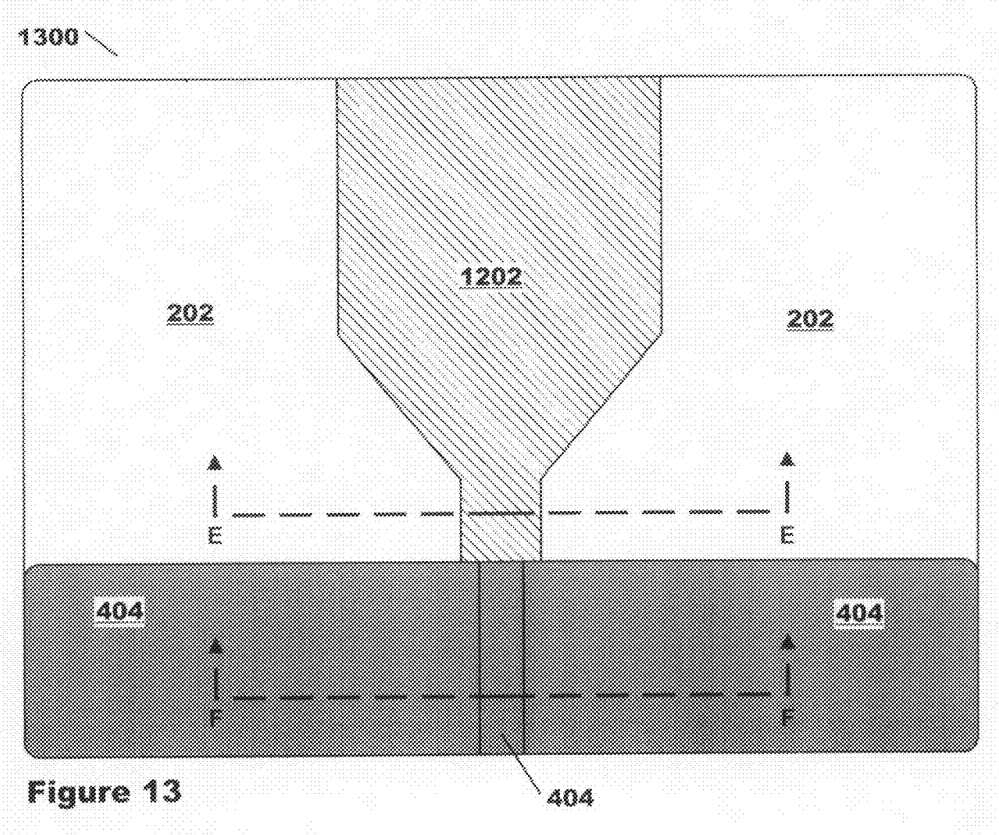
FIG. 13 is a plan view of the structure of FIG. 12, subsequent to the removal of photo-resist layer 502, in accordance with an embodiment of the present invention.
Figure 14:
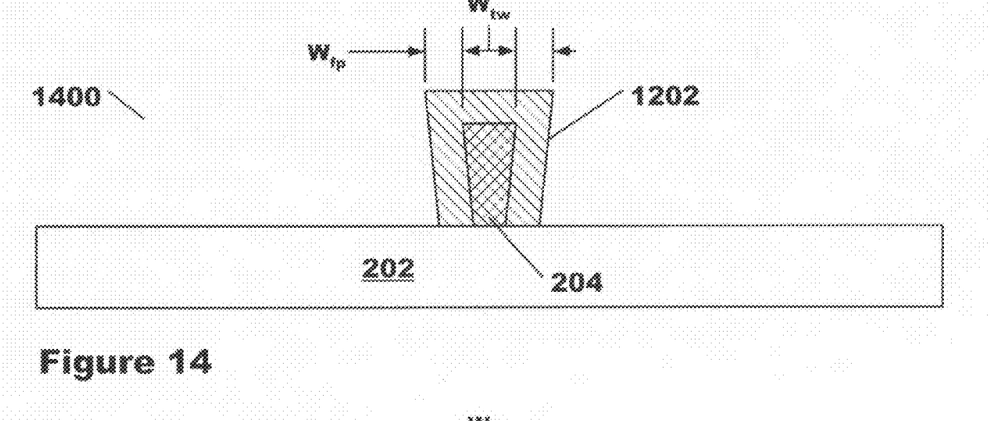
FIG. 14 is a partial cross section view through section E-E of FIG. 13, in accordance with an embodiment of the present invention; and, FIG. 15 is a partial cross section view through section F-F of FIG. 13, in accordance with an embodiment of the present invention.
Figure 15:
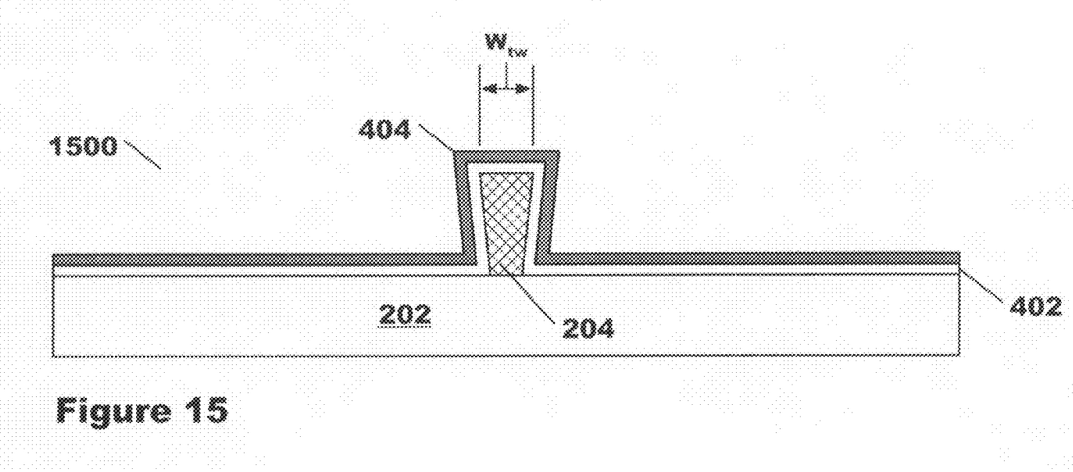

FIG. 12 is a plan view 1200 of the structure of FIG. 11, subsequent to the electroplating of layer 1202 onto the exposed portion of pole layer 204, in accordance with an embodiment of the present invention. This step increases the dimensions of pole layer 204, effectively creating a flare point at the interface of photo resist layer 502. FIG. 13 is a plan view 1300 of the structure of FIG. 12, subsequent to the removal of photo-resist layer 502. Note that the remaining portion of outer gap layer 404 is now exposed. FIGS. 14 and 15 are a partial cross sections view 1400, 1500 through sections E-E, F-F, respectively of FIG. 13. The width of the original pole layer is $W_{tw}$, whereas the width of the plated portion increases to $W_{fp}$ at the flare point. Typically, $W_{fp}$ is between about two times to three times (200% to 300%) $W_{tw}$. The remaining steps for fabricating the wrap around (or trailing) shield will not be detailed further in this disclosure, as they are evident to those skilled in the art. Portions of gap layers 402/404 may be removed in subsequent process steps if a shield gap is desired, or they may be left in place and a shield deposited over them.

FIGS. 4-12 illustrate blanket deposition of gap layers 402 and 404, but it should be evident to one of ordinary skill in the art that selective coverage of just the pole surfaces could also be practiced as an alternative embodiment of the present invention. This is less desirable because additional steps will be required to limit deposition to the pole, or remove the gap layers from other regions. Additionally, it may be desirable to have broad surface coverage (for example, under photo resist mask layer 502) of the top gap layer 404 if a conductive material is selected, because the top gap can then double as a plating seed layer for the shield.

The present invention is not limited by the previous embodiments heretofore described. Rather, the scope of the present invention is to be defined by these descriptions taken together with the attached claims and their equivalents.

What is claimed is:

1. A method for fabricating a thin film perpendicular write head comprising:
    fabricating a magnetic pole layer, said magnetic pole layer having a first portion and a second portion;
    depositing a first non-magnetic gap layer on said first and said second portions of said magnetic pole layer, said first non-magnetic gap layer being resistant to etching in solutions having a pH less than 7;
    depositing a second non-magnetic gap layer on said first non-magnetic gap layer deposited on said first and said second portions of said magnetic pole layer, said second non-magnetic gap layer being resistant to etching in solutions having a pH greater than 7;
    covering said second non-magnetic gap layer deposited on said first portion of said pole layer with a photo resist layer;
    removing said second non-magnetic gap layer deposited on said second portion of said magnetic pole with a solution having a pH of less than 7, without damaging said photo resist layer; and,
    removing said first non-magnetic gap layer deposited on said second portion of said magnetic pole layer with a solution having a pH greater than 7, without damaging said second portion of said magnetic pole.

2. The method as recited in claim 1, further comprising depositing magnetic material on said second portion of said magnetic pole layer, subsequent to removing said first non-magnetic gap layer, creating a flare point on said magnetic pole layer at the boundary between said first portion and said second portion of said magnetic pole layer.

3. The method as recited in claim 1, wherein said first non-magnetic gap layer is alumina.

4. The method as recited in claim 1, wherein said second non-magnetic gap layer comprises Ti.

5. The method as recited in claim 4, wherein said second non-magnetic gap layer comprises oxides of Ti.

6. The method as recited in claim 1, wherein said second non-magnetic gap layer comprises Cr.

7. The method as recited in claim 1, wherein said second non-magnetic gap layer comprises Al.

8. The method as recited in claim 1, wherein said second non-magnetic gap layer comprises oxides of tantalum.

9. A method for fabricating a thin film perpendicular write head comprising:
    fabricating a magnetic pole layer, said magnetic pole layer having a first portion and a second portion;
    depositing a first non-magnetic gap layer on said first and said second portions of said magnetic pole layer, said first non-magnetic gap layer comprising alumina;
    depositing a second non-magnetic gap layer on said first non-magnetic gap layer deposited on said first and said second portions of said magnetic pole layer, said second non-magnetic gap layer being resistant to etching in solutions having a pH greater than 7;
    covering said second non-magnetic gap layer deposited on said first portion of said pole layer with a photo resist layer;
    removing said second non-magnetic gap layer deposited on said second portion of said magnetic pole with a solution having a pH of less than 7, without damaging said photo resist layer; and,
    removing said first non-magnetic gap layer deposited on said second portion of said magnetic pole layer with a solution having a pH greater than 7, without damaging said second portion of said magnetic pole.

10. The method as recited in claim 9, further comprising depositing magnetic material on said second portion of said magnetic pole layer, subsequent to removing said first non-magnetic gap layer, creating a flare point on said magnetic pole layer at the boundary between said first portion and said second portion of said magnetic pole layer.

11. The method as recited in claim 10, wherein said magnetic material is deposited by electroplating.

12. The method as recited in claim 10, wherein a width of said second portion of said magnetic pole layer is increased by a factor between 2 and 3 times subsequent to depositing said magnetic material.

13. The method as recited in claim 9, wherein said second non-magnetic gap layer comprises Ti.

14. The method as recited in claim 13, wherein said second non-magnetic gap layer comprises oxides of Ti.

15. The method as recited in claim 9, wherein said second non-magnetic gap layer comprises Cr.

16. The method as recited in claim 9, wherein said second non-magnetic gap layer comprises Al.

17. The method as recited in claim 9, wherein said second non-magnetic gap layer comprises oxides of tantalum.

18. A method for fabricating a thin film perpendicular write head comprising:
    fabricating a magnetic pole layer, said magnetic pole layer having a first portion and a second portion;
    depositing a first non-magnetic gap layer on said first and said second portions of said magnetic pole layer, said first non-magnetic gap layer comprising alumina;
    depositing a second non-magnetic gap layer on said first non-magnetic gap layer deposited on said first and said second portions of said magnetic pole layer, wherein said second non-magnetic gap layer is chosen from the group consisting of Cr, Al, Ti, oxides of Ti, and oxides of tantalum;
    removing said second non-magnetic gap layer deposited on said second portion of said magnetic pole with a solution having a pH of less than 7; and,
    removing said first non-magnetic gap layer deposited on said second portion of said magnetic pole layer with a solution having a pH greater than 7.

19. The method as recited in claim 18, further comprising depositing magnetic material on said second portion of said magnetic pole layer, subsequent to removing said first non-magnetic gap layer, creating a flare point on said magnetic pole layer at the boundary between said first portion and said second portion of said magnetic pole layer.

20. The method as recited in claim 19, wherein a width of said second portion of said magnetic pole layer is increased by a factor between 2 and 3 times subsequent to depositing said magnetic material.

\* \* \* \* \*